US008126889B2

(12) United States Patent
Pitt

(10) Patent No.: US 8,126,889 B2
(45) Date of Patent: Feb. 28, 2012

(54) LOCATION FIDELITY ADJUSTMENT BASED ON MOBILE SUBSCRIBER PRIVACY PROFILE

(75) Inventor: Lance Douglas Pitt, Kent, WA (US)

(73) Assignee: TeleCommunication Systems, Inc., Annapolis, MD (US)

(*) Notice: Subject to any disclaimer, the term of this patent is extended or adjusted under 35 U.S.C. 154(b) by 322 days.

(21) Appl. No.: 10/265,390

(22) Filed: Oct. 7, 2002

(65) Prior Publication Data

US 2003/0187803 A1   Oct. 2, 2003

Related U.S. Application Data

(60) Provisional application No. 60/367,711, filed on Mar. 28, 2002, provisional application No. 60/382,368, filed on May 23, 2002.

(51) Int. Cl.
*G06F 7/00* (2006.01)
(52) U.S. Cl. .................. 707/736; 455/404.2; 455/456.1; 455/456.2; 455/456.3; 455/414.2

(58) Field of Classification Search .............. 707/9, 200, 707/10, 736; 455/404.2, 414.2, 456.1–3, 455/456.1–456.3, 414, 0.2
See application file for complete search history.

(56) References Cited

U.S. PATENT DOCUMENTS 4,445,118 A   4/1984   Taylor et al.
(Continued)

OTHER PUBLICATIONS

M. Spreitzer et al., Providing Location Information in a Ubiquitous Computing Environment, Operating Systems Review (SIGOPS), Dec. 1993, No. 5., pp. 270-283.

(Continued)

*Primary Examiner* — Hanh Thai
*Assistant Examiner* — Michael Le
(74) *Attorney, Agent, or Firm* — William H. Bollman

(57) ABSTRACT

The present invention utilizes location based wireless technology in a wireless network to dynamically automate the accuracy of location information provided to requesting parties based on external criteria, e.g., the time of day. The location information may be altered by removing particular parts (e.g., by removing street information, or city information), or by mathematically loosening the accuracy of the location of the particular wireless user.

10 Claims, 5 Drawing Sheets

U.S. PATENT DOCUMENTS

| | | | |
|---|---|---|---|
| 4,928,107 A | 5/1990 | Kuroda et al. | |
| 4,972,484 A | 11/1990 | Theile et al. | |
| 5,126,722 A | 6/1992 | Kamis | |
| 5,283,570 A | 2/1994 | DeLuca et al. | |
| 5,301,354 A | 4/1994 | Schwendeman et al. | |
| 5,311,516 A | 5/1994 | Kuznicki et al. | |
| 5,327,529 A | 7/1994 | Fults et al. | |
| 5,335,246 A | 8/1994 | Yokev et al. | |
| 5,351,235 A | 9/1994 | Lahtinen | |
| 5,365,451 A | 11/1994 | Wang et al. | |
| 5,418,537 A | 5/1995 | Bird | |
| 5,422,813 A | 6/1995 | Schuchman et al. | |
| 5,479,408 A | 12/1995 | Will | |
| 5,485,163 A | 1/1996 | Singer et al. | |
| 5,504,491 A | 4/1996 | Chapman | |
| 5,506,886 A | 4/1996 | Maine et al. | |
| 5,517,199 A | 5/1996 | DiMattei | |
| 5,530,655 A | 6/1996 | Lokhoff et al. | |
| 5,530,914 A | 6/1996 | McPheters | |
| 5,539,395 A | 7/1996 | Buss et al. | |
| 5,539,829 A | 7/1996 | Lokhoff et al. | |
| 5,546,445 A | 8/1996 | Dennison | |
| 5,568,153 A | 10/1996 | Beliveau | |
| 5,583,774 A | 12/1996 | Diesel | |
| 5,587,201 A | 12/1996 | Rho et al. | |
| 5,594,780 A | 1/1997 | Wiedeman et al. | |
| 5,606,618 A | 2/1997 | Lokhoff et al. | |
| 5,629,693 A | 5/1997 | Janky | |
| 5,633,630 A | 5/1997 | Park | |
| 5,636,276 A | 6/1997 | Brugger | |
| 5,661,652 A | 8/1997 | Sprague et al. | |
| 5,661,755 A | 8/1997 | Van De Kerkhof et al. | |
| 5,689,245 A | 11/1997 | Noreen et al. | |
| 5,699,053 A | 12/1997 | Jonsson | |
| 5,704,029 A | 12/1997 | Wright, Jr. | |
| 5,721,781 A | 2/1998 | Deo et al. | |
| 5,727,057 A * | 3/1998 | Emery et al. | 379/201.07 |
| 5,731,785 A | 3/1998 | Lemelson et al. | |
| 5,765,152 A | 6/1998 | Erickson | |
| 5,771,353 A | 6/1998 | Eggleston et al. | |
| 5,774,670 A | 6/1998 | Montulli | |
| 5,809,415 A | 9/1998 | Rossmann | |
| 5,812,086 A | 9/1998 | Bertiger et al. | |
| 5,812,087 A | 9/1998 | Krasner | |
| 5,841,396 A | 11/1998 | Krasner | |
| 5,857,201 A | 1/1999 | Wright, Jr. et al. | |
| 5,864,667 A | 1/1999 | Barkan | |
| 5,874,914 A | 2/1999 | Krasner | |
| 5,896,369 A | 4/1999 | Warsta et al. | |
| 5,898,391 A | 4/1999 | Jefferies et al. | |
| 5,922,074 A | 7/1999 | Richard et al. | |
| 5,930,250 A | 7/1999 | Klok et al. | |
| 5,945,944 A | 8/1999 | Krasner | |
| 5,946,629 A | 8/1999 | Sawyer et al. | |
| 5,950,137 A | 9/1999 | Kim | |
| 5,960,362 A | 9/1999 | Grob et al. | |
| 5,983,099 A | 11/1999 | Yao et al. | |
| 5,999,124 A | 12/1999 | Sheynblat | |
| 6,032,051 A | 2/2000 | Hall et al. | |
| 6,052,081 A | 4/2000 | Krasner | |
| 6,058,338 A | 5/2000 | Agashe et al. | |
| 6,061,018 A | 5/2000 | Sheynblat | |
| 6,064,336 A | 5/2000 | Krasner | |
| 6,067,045 A | 5/2000 | Castelloe et al. | |
| 6,081,229 A | 6/2000 | Soliman et al. | |
| 6,085,320 A | 7/2000 | Kaliski, Jr. | |
| 6,118,403 A | 9/2000 | Lang | |
| 6,121,923 A | 9/2000 | King | |
| 6,124,810 A | 9/2000 | Segal et al. | |
| 6,131,067 A | 10/2000 | Girerd et al. | |
| 6,133,874 A | 10/2000 | Krasner | |
| 6,134,483 A | 10/2000 | Vayanos et al. | |
| 6,147,598 A | 11/2000 | Murphy | |
| 6,150,980 A | 11/2000 | Krasner | |
| 6,154,172 A | 11/2000 | Piccionelli et al. | |
| 6,169,901 B1 | 1/2001 | Boucher | |
| 6,169,902 B1 | 1/2001 | Kawamoto | |
| 6,178,506 B1 | 1/2001 | Quick, Jr. | |
| 6,185,427 B1 | 2/2001 | Krasner et al. | |
| 6,188,354 B1 | 2/2001 | Soliman et al. | |
| 6,188,909 B1 | 2/2001 | Alanara et al. | |
| 6,189,089 B1 | 2/2001 | Walker et al. | |
| 6,189,098 B1 | 2/2001 | Kaliski, Jr. | |
| 6,195,557 B1 | 2/2001 | Havinis et al. | |
| 6,204,798 B1 | 3/2001 | Fleming | |
| 6,205,330 B1 | 3/2001 | Winbladh | |
| 6,208,290 B1 | 3/2001 | Krasner | |
| 6,215,441 B1 | 4/2001 | Moeglein et al. | |
| 6,239,742 B1 | 5/2001 | Krasner | |
| 6,247,135 B1 | 6/2001 | Feague | |
| 6,249,783 B1 | 6/2001 | Crone et al. | |
| 6,249,873 B1 | 6/2001 | Richard et al. | |
| 6,252,544 B1 | 6/2001 | Hoffberg | |
| 6,253,203 B1 | 6/2001 | O'Flaherty et al. | |
| 6,260,147 B1 | 7/2001 | Quick, Jr. | |
| 6,275,692 B1 | 8/2001 | Skog | |
| 6,275,849 B1 | 8/2001 | Ludwig | |
| 6,297,768 B1 | 10/2001 | Allen, Jr. | |
| 6,307,504 B1 | 10/2001 | Sheynblat | |
| 6,308,269 B2 | 10/2001 | Proidl | |
| 6,313,786 B1 | 11/2001 | Sheynblat et al. | |
| 6,321,250 B1 | 11/2001 | Knape | |
| 6,321,257 B1 | 11/2001 | Kotola et al. | |
| 6,324,542 B1 | 11/2001 | Wright, Jr. et al. | |
| 6,327,473 B1 | 12/2001 | Soliman et al. | |
| 6,333,919 B2 | 12/2001 | Gaffney | |
| 6,360,093 B1 | 3/2002 | Ross et al. | |
| 6,360,102 B1 * | 3/2002 | Havinis et al. | 455/457 |
| 6,363,254 B1 | 3/2002 | Jones et al. | |
| 6,367,019 B1 | 4/2002 | Ansell et al. | |
| 6,370,389 B1 | 4/2002 | Isomursu et al. | |
| 6,377,209 B1 | 4/2002 | Krasner | |
| 6,377,810 B1 * | 4/2002 | Geiger et al. | 455/456.2 |
| 6,385,458 B1 * | 5/2002 | Papadimitriou et al. | 455/456.2 |
| 6,400,304 B1 | 6/2002 | Chubbs | |
| 6,400,314 B1 | 6/2002 | Krasner | |
| 6,400,958 B1 | 6/2002 | Isomursu et al. | |
| 6,411,254 B1 | 6/2002 | Moeglein et al. | |
| 6,421,002 B2 | 7/2002 | Krasner | |
| 6,429,812 B1 | 8/2002 | Hoffberg | |
| 6,430,504 B1 | 8/2002 | Gilbert et al. | |
| 6,433,734 B1 | 8/2002 | Krasner | |
| 6,442,391 B1 | 8/2002 | Johansson et al. | |
| 6,449,473 B1 | 9/2002 | Raivisto | |
| 6,449,476 B1 | 9/2002 | Hutchison, IV et al. | |
| 6,456,852 B2 | 9/2002 | Bar et al. | |
| 6,463,272 B1 | 10/2002 | Wallace et al. | |
| 6,477,150 B1 | 11/2002 | Maggenti et al. | |
| 6,504,491 B1 | 1/2003 | Christians | |
| 6,505,048 B1 * | 1/2003 | Moles et al. | 455/456.1 |
| 6,505,049 B1 | 1/2003 | Dorenbosch | |
| 6,510,387 B2 | 1/2003 | Fuchs et al. | |
| 6,512,922 B1 | 1/2003 | Burg et al. | |
| 6,512,930 B2 | 1/2003 | Sandegren | |
| 6,515,623 B2 | 2/2003 | Johnson | |
| 6,519,466 B2 | 2/2003 | Pande et al. | |
| 6,522,682 B1 | 2/2003 | Kohli et al. | |
| 6,525,687 B2 | 2/2003 | Roy et al. | |
| 6,525,688 B2 | 2/2003 | Chou et al. | |
| 6,529,829 B2 | 3/2003 | Turetzky et al. | |
| 6,531,982 B1 | 3/2003 | White et al. | |
| 6,538,757 B1 | 3/2003 | Sansone | |
| 6,539,200 B1 | 3/2003 | Schiff | |
| 6,539,304 B1 | 3/2003 | Chansarkar | |
| 6,542,464 B1 | 4/2003 | Takeda et al. | |
| 6,542,734 B1 | 4/2003 | Abrol et al. | |
| 6,542,743 B1 | 4/2003 | Soliman | |
| 6,549,776 B1 | 4/2003 | Joong | |
| 6,549,844 B1 | 4/2003 | Egberts | |
| 6,556,832 B1 | 4/2003 | Soliman | |
| 6,560,461 B1 | 5/2003 | Fomukong et al. | |
| 6,560,534 B2 | 5/2003 | Abraham et al. | |
| 6,567,035 B1 | 5/2003 | Elliott | |
| 6,570,530 B2 | 5/2003 | Gaal et al. | |
| 6,574,558 B2 | 6/2003 | Kohli | |
| 6,580,390 B1 | 6/2003 | Hay | |
| 6,584,552 B1 | 6/2003 | Kuno et al. | |

| Patent | Type | Date | Inventor(s) |
|---|---|---|---|
| 6,594,500 | B2 | 7/2003 | Bender et al. |
| 6,597,311 | B2 | 7/2003 | Sheynblat et al. |
| 6,603,973 | B1 | 8/2003 | Foladare et al. |
| 6,606,495 | B1 | 8/2003 | Korpi et al. |
| 6,606,554 | B2 | 8/2003 | Edge |
| 6,609,004 | B1 | 8/2003 | Morse et al. |
| 6,611,757 | B2 | 8/2003 | Brodie |
| 6,618,670 | B1 | 9/2003 | Chansarkar |
| 6,621,452 | B2 | 9/2003 | Knockeart et al. |
| 6,628,233 | B2 | 9/2003 | Knockeart et al. |
| 6,630,093 | B1 | 10/2003 | Jones |
| 6,633,255 | B2 | 10/2003 | Krasner |
| 6,640,184 | B1 | 10/2003 | Rabe |
| 6,650,288 | B1 | 11/2003 | Pitt et al. |
| 6,661,372 | B1 | 12/2003 | Girerd et al. |
| 6,662,014 | B1 * | 12/2003 | Walsh ........................ 455/456.2 |
| 6,665,539 | B2 | 12/2003 | Sih et al. |
| 6,665,541 | B1 | 12/2003 | Krasner et al. |
| 6,671,620 | B1 | 12/2003 | Garin et al. |
| 6,677,894 | B2 | 1/2004 | Sheynblat |
| 6,680,694 | B1 | 1/2004 | Knockeart et al. |
| 6,680,695 | B2 | 1/2004 | Turetzky et al. |
| 6,687,504 | B1 | 2/2004 | Raith |
| 6,691,019 | B2 | 2/2004 | Seeley et al. |
| 6,694,258 | B2 | 2/2004 | Johnson et al. |
| 6,697,629 | B1 | 2/2004 | Grilli et al. |
| 6,698,195 | B1 | 3/2004 | Hellinger |
| 6,701,144 | B2 | 3/2004 | Kirbas et al. |
| 6,703,971 | B2 | 3/2004 | Pande et al. |
| 6,703,972 | B2 | 3/2004 | Van Diggelen |
| 6,704,651 | B2 | 3/2004 | Van Diggelen |
| 6,707,421 | B1 | 3/2004 | Drury et al. |
| 6,714,793 | B1 | 3/2004 | Carey et al. |
| 6,718,174 | B2 | 4/2004 | Vayanos |
| 6,720,915 | B2 | 4/2004 | Sheynblat |
| 6,721,578 | B2 | 4/2004 | Minear et al. |
| 6,721,871 | B2 | 4/2004 | Piispanen et al. |
| 6,724,342 | B2 | 4/2004 | Bloebaum et al. |
| 6,725,159 | B2 | 4/2004 | Krasner |
| 6,731,940 | B1 | 5/2004 | Nagendran |
| 6,734,821 | B2 | 5/2004 | Van Diggelen |
| 6,738,013 | B2 | 5/2004 | Orler et al. |
| 6,738,800 | B1 | 5/2004 | Aquilon et al. |
| 6,741,842 | B2 | 5/2004 | Goldberg et al. |
| 6,745,038 | B2 | 6/2004 | Callaway et al. |
| 6,747,596 | B2 | 6/2004 | Orler et al. |
| 6,748,195 | B1 | 6/2004 | Phillips |
| 6,751,464 | B1 | 6/2004 | Burg |
| 6,756,938 | B2 | 6/2004 | Zhao et al. |
| 6,757,544 | B2 | 6/2004 | Rangarajan |
| 6,772,340 | B1 | 8/2004 | Peinado et al. |
| 6,775,655 | B1 | 8/2004 | Peinado et al. |
| 6,775,802 | B2 | 8/2004 | Gaal |
| 6,778,136 | B2 | 8/2004 | Gronemeyer |
| 6,778,885 | B2 | 8/2004 | Agashe et al. |
| 6,781,963 | B2 | 8/2004 | Crockett et al. |
| 6,788,249 | B1 | 9/2004 | Farmer et al. |
| 6,795,699 | B1 | 9/2004 | McCraw et al. |
| 6,799,050 | B1 | 9/2004 | Krasner |
| 6,801,124 | B2 | 10/2004 | Naiton |
| 6,801,159 | B2 | 10/2004 | Swope et al. |
| 6,804,524 | B1 | 10/2004 | Vandermeijden |
| 6,807,534 | B1 | 10/2004 | Erickson |
| 6,808,534 | B1 | 10/2004 | Escano |
| 6,810,323 | B1 | 10/2004 | Bullock et al. |
| 6,813,499 | B2 * | 11/2004 | McDonnell et al. ........ 455/456.1 |
| 6,813,560 | B2 | 11/2004 | Van Diggelen et al. |
| 6,816,111 | B2 | 11/2004 | Krasner |
| 6,816,710 | B2 | 11/2004 | Krasner |
| 6,816,719 | B1 | 11/2004 | Heinonen et al. |
| 6,816,734 | B2 | 11/2004 | Wong et al. |
| 6,820,069 | B1 | 11/2004 | Kogan |
| 6,820,269 | B2 | 11/2004 | Baucke et al. |
| 6,829,475 | B1 | 12/2004 | Lee et al. |
| 6,832,373 | B2 | 12/2004 | O'Neill |
| 6,833,785 | B2 | 12/2004 | Brown et al. |
| 6,839,020 | B2 | 1/2005 | Geier et al. |
| 6,839,021 | B2 | 1/2005 | Sheynblat et al. |
| 6,842,715 | B1 | 1/2005 | Gaal |
| 6,853,849 | B1 | 2/2005 | Tognazzini |
| 6,853,916 | B2 | 2/2005 | Fuchs et al. |
| 6,856,282 | B2 | 2/2005 | Mauro et al. |
| 6,861,980 | B1 | 3/2005 | Rowitch et al. |
| 6,865,171 | B1 | 3/2005 | Nilsson |
| 6,865,395 | B2 | 3/2005 | Riley |
| 6,867,734 | B2 | 3/2005 | Voor et al. |
| 6,873,854 | B2 | 3/2005 | Crockett et al. |
| 6,885,940 | B2 | 4/2005 | Brodie et al. |
| 6,888,497 | B2 | 5/2005 | King et al. |
| 6,888,932 | B2 | 5/2005 | Snip et al. |
| 6,895,238 | B2 | 5/2005 | Newell et al. |
| 6,895,249 | B2 | 5/2005 | Gaal |
| 6,895,324 | B2 | 5/2005 | Straub |
| 6,900,758 | B1 | 5/2005 | Mann et al. |
| 6,903,684 | B1 | 6/2005 | Simic et al. |
| 6,904,029 | B2 | 6/2005 | Fors et al. |
| 6,907,224 | B2 | 6/2005 | Younis |
| 6,907,238 | B2 | 6/2005 | Leung |
| 6,912,395 | B2 | 6/2005 | Benes et al. |
| 6,915,208 | B2 | 7/2005 | Garin et al. |
| 6,917,331 | B2 | 7/2005 | Gronemeyer |
| 6,930,634 | B2 | 8/2005 | Peng et al. |
| 6,937,187 | B2 | 8/2005 | Van Diggelen et al. |
| 6,937,872 | B2 | 8/2005 | Krasner |
| 6,941,144 | B2 | 9/2005 | Stein |
| 6,944,540 | B2 | 9/2005 | King et al. |
| 6,947,772 | B2 | 9/2005 | Minear et al. |
| 6,950,058 | B1 | 9/2005 | Davis et al. |
| 6,956,467 | B1 | 10/2005 | Mercado, Jr. |
| 6,957,073 | B2 | 10/2005 | Bye |
| 6,961,019 | B1 | 11/2005 | McConnell et al. |
| 6,961,562 | B2 | 11/2005 | Ross |
| 6,965,754 | B2 | 11/2005 | King |
| 6,965,767 | B2 | 11/2005 | Maggenti et al. |
| 6,968,195 | B2 | 11/2005 | Nowak |
| 6,970,917 | B1 | 11/2005 | Kushwaha et al. |
| 6,973,166 | B1 | 12/2005 | Tsumpes |
| 6,973,320 | B2 | 12/2005 | Brown et al. |
| 6,975,266 | B2 | 12/2005 | Abraham et al. |
| 6,978,453 | B2 | 12/2005 | Rao et al. |
| 6,980,816 | B2 | 12/2005 | Rohles et al. |
| 6,985,105 | B1 | 1/2006 | Pitt et al. |
| 6,996,720 | B1 | 2/2006 | DeMello et al. |
| 6,999,782 | B2 | 2/2006 | Shaughnessy |
| 7,024,321 | B1 | 4/2006 | Deninger et al. |
| 7,024,393 | B1 | 4/2006 | Peinado et al. |
| 7,047,411 | B1 | 5/2006 | DeMello et al. |
| 7,064,656 | B2 | 6/2006 | Belcher et al. |
| 7,065,351 | B2 | 6/2006 | Carter et al. |
| 7,065,507 | B2 | 6/2006 | Mohammed et al. |
| 7,071,814 | B1 | 7/2006 | Schorman |
| 7,079,857 | B2 | 7/2006 | Maggenti et al. |
| 7,103,018 | B1 | 9/2006 | Hansen et al. |
| 7,103,574 | B1 | 9/2006 | Peinado et al. |
| 7,106,717 | B2 | 9/2006 | Rousseau et al. |
| 7,136,838 | B1 | 11/2006 | Peinado et al. |
| 7,151,946 | B2 | 12/2006 | Maggenti et al. |
| 7,177,623 | B2 | 2/2007 | Baldwin |
| 7,209,969 | B2 | 4/2007 | Lahti et al. |
| 7,218,940 | B2 | 5/2007 | Niemenmaa et al. |
| 7,221,959 | B2 | 5/2007 | Lindqvist et al. |
| 7,301,494 | B2 | 11/2007 | Waters |
| 7,471,236 | B1 | 12/2008 | Pitt |
| 7,504,983 | B2 | 3/2009 | Chen |
| 7,629,926 | B2 | 12/2009 | Pitt |
| 7,764,219 | B2 | 7/2010 | Pitt |
| 2001/0011247 | A1 | 8/2001 | O'Flaherty et al. |
| 2002/0002036 | A1 * | 1/2002 | Uehara et al. ................... 455/41 |
| 2002/0037735 | A1 | 3/2002 | Meggenti et al. |
| 2002/0038182 | A1 | 3/2002 | Wong |
| 2002/0052214 | A1 | 5/2002 | Meggenti et al. |
| 2002/0061760 | A1 | 5/2002 | Meggenti et al. |
| 2002/0069529 | A1 | 6/2002 | Wieres |
| 2002/0102999 | A1 | 8/2002 | Maggenti et al. |
| 2002/0111816 | A1 * | 8/2002 | Lortscher et al. .................. 705/1 |
| 2002/0112047 | A1 | 8/2002 | Kushwaha |
| 2002/0135504 | A1 | 9/2002 | Singer |
| 2002/0173317 | A1 | 11/2002 | Nykanen |

| | | |
|---|---|---|
| 2002/0173325 A1 | 11/2002 | Maggenti |
| 2002/0198632 A1 | 12/2002 | Breed et al. |
| 2003/0009602 A1 | 1/2003 | Jacobs et al. |
| 2003/0037163 A1 | 2/2003 | Kitada et al. |
| 2003/0065788 A1 | 4/2003 | Salomaki |
| 2003/0078053 A1* | 4/2003 | Abtin et al. .................. 455/456 |
| 2003/0078064 A1 | 4/2003 | Chan |
| 2003/0078886 A1 | 4/2003 | Minear |
| 2003/0081557 A1 | 5/2003 | Mettala et al. |
| 2003/0101329 A1 | 5/2003 | Lahti et al. |
| 2003/0101341 A1 | 5/2003 | Kettler et al. |
| 2003/0103484 A1 | 6/2003 | Oommen et al. |
| 2003/0114148 A1 | 6/2003 | Albertsson |
| 2003/0114157 A1 | 6/2003 | Spitz et al. |
| 2003/0119528 A1 | 6/2003 | Pew |
| 2003/0151507 A1 | 8/2003 | Andre |
| 2003/0153340 A1 | 8/2003 | Crockett et al. |
| 2003/0153341 A1 | 8/2003 | Crockett et al. |
| 2003/0153342 A1 | 8/2003 | Crockett et al. |
| 2003/0153343 A1 | 8/2003 | Crockett et al. |
| 2003/0161298 A1 | 8/2003 | Bergman et al. |
| 2003/0204640 A1 | 10/2003 | Sahinoja et al. |
| 2003/0223381 A1 | 12/2003 | Schroderus |
| 2004/0002326 A1 | 1/2004 | Maher |
| 2004/0044623 A1 | 3/2004 | Wake et al. |
| 2004/0064550 A1 | 4/2004 | Sakata et al. |
| 2004/0068724 A1 | 4/2004 | Gardner et al. |
| 2004/0090121 A1 | 5/2004 | Simonds et al. |
| 2004/0132428 A1* | 7/2004 | Mulligan ..................... 455/411 |
| 2004/0204806 A1 | 10/2004 | Chen et al. |
| 2004/0205151 A1 | 10/2004 | Sprigg et al. |
| 2004/0229632 A1 | 11/2004 | Flynn et al. |
| 2005/0003797 A1 | 1/2005 | Baldwin |
| 2005/0028034 A1 | 2/2005 | Gantman et al. |
| 2005/0039178 A1 | 2/2005 | Marolia et al. |
| 2005/0041578 A1 | 2/2005 | huotari et al. |
| 2005/0086340 A1 | 4/2005 | Kang |
| 2005/0086467 A1 | 4/2005 | Asokan et al. |
| 2005/0112030 A1 | 5/2005 | Gaus |
| 2005/0136895 A1 | 6/2005 | Thenthiruperai |
| 2005/0172217 A1 | 8/2005 | Leung |
| 2005/0174987 A1 | 8/2005 | Raghav |
| 2005/0209995 A1 | 9/2005 | Aksu et al. |
| 2005/0246217 A1 | 11/2005 | Horn |
| 2005/0259675 A1 | 11/2005 | Tuohino et al. |
| 2006/0053225 A1 | 3/2006 | Poikselka et al. |
| 2006/0058045 A1 | 3/2006 | Nilsen |
| 2006/0074618 A1 | 4/2006 | Miller |
| 2006/0090136 A1 | 4/2006 | Miller |
| 2006/0132349 A1 | 6/2006 | Stern |
| 2006/0212558 A1 | 9/2006 | Sahinoja et al. |
| 2006/0212562 A1 | 9/2006 | Kushwaha et al. |
| 2006/0234639 A1 | 10/2006 | Kushwaha et al. |
| 2006/0234698 A1 | 10/2006 | Fok et al. |
| 2007/0026854 A1 | 2/2007 | nath et al. |
| 2007/0030539 A1 | 2/2007 | nath et al. |
| 2007/0030973 A1 | 2/2007 | Mikan |
| 2007/0042765 A1 | 2/2007 | Bailin |
| 2007/0207797 A1 | 9/2007 | Pitt |
| 2009/0015461 A1 | 1/2009 | Pitt |
| 2009/0079614 A1 | 3/2009 | Pitt |
| 2010/0214148 A1 | 8/2010 | Kuhn |
| 2010/0214149 A1 | 8/2010 | Kuhn |
| 2010/0238065 A1 | 9/2010 | Pitt |

OTHER PUBLICATIONS

U. Leonhardt et al., Toward a General Location Service for Mobile Environments, Services in Distributed and Networked Environments, Dept. of Computing, Imperial College, IEEE, 1996, pp. 43-50.

D. Kesdogan, Secure Location Information Management in Cellular Radio Systems, Aachen University of Technology, Computer Science Department, 1995, pp. 35-40.

ETSI Technical Report, Security Techniques Advisory Group (STAG); Definition of user requirements for lawful interception of telecommunications; Requirements of Law Enforcement Agencies, Dec. 1996, ETR 331, pp. 1-22.

U.S. Appl. No. 09/539,495, filed Mar. 2000, Abrol.

B.W. Parkinson et al., Global Positioning System: Theory and Applications, vol. 1, Progress in Astronautics and Aeronautics, vol. 163, American Institute of Aeronautics and Astronautics, Inc., p. 184-187, 1996.

* cited by examiner

| TIME OF DAY SETTINGS | 9AM-5 | 5-9AM | | |
|---|---|---|---|---|
| CITY | ✓ | | | |
| STATE | ✓ | | | |
| ⋮ | | | | |
| | | | | |
| STREET | | | | |

SUBSCRIBER FIDELITY SETTINGS

FIG. 3

LOCATION FIDELITY ADJUSTMENT BASED ON MOBILE SUBSCRIBER PRIVACY PROFILE

The present application claims priority from U.S. Appl. No. 60/367,711, filed Mar. 28, 2002, entitled "Mobile Subscriber Privacy Evaluation Using Solicited vs. Unsolicited Differentiation"; and from U.S. Appl. No. 60/382,368, filed May 23, 2002, entitled "Location Fidelity Adjustment Based on Mobile Subscriber Privacy Profile", the entirety of both of which are expressly incorporated herein by reference.

BACKGROUND OF THE INVENTION

1. Field of the Invention

This invention relates generally to wireless and long distance carriers, Internet service providers (ISPs), and information content delivery services/providers and long distance carriers. More particularly, it relates to location services for the wireless industry.

2. Background of Related Art

Location technology in a wireless world essentially is surveillance technology. When location technology is used to provide services other than emergency services it's necessary to allow the mobile subscriber to control to whom their location may be reported.

Currently, privacy solutions in a wireless carrier's network are based on the source of the information. For instance, one conventional solution provides a privacy profile evaluator wherein the wireless user may define the requesting sources to whom location information may be provided.

Other commercial privacy solutions either use a default "optout" technique (i.e., the subscriber's privacy info is disseminated unless explicitly denied to all requestors by the subscriber), or a default "opt-in" technique (i.e., the subscriber's privacy info is not disseminated unless explicitly allowed by the subscriber). Either option works well in some scenarios, but may become very cumbersome in other scenarios.

There is a need for a less cumbersome, more efficient and generally better privacy solution, particularly for location based applications.

SUMMARY OF THE INVENTION

In accordance with the principles of the present invention, a method of adjusting private information regarding a wireless user comprises receiving a request for private information regarding a particular wireless user. Complete private information corresponding to the particular wireless user is adjusted to be less complete based on a given criteria, before providing the same to the requesting party. A completeness of the private information is reduced from a most complete version stored in a database.

BRIEF DESCRIPTION OF THE DRAWINGS

Features and advantages of the present invention will become apparent to those skilled in the art from the following description with reference to the drawings, in which:

FIG. 3 shows an exemplary subscriber fidelity setting table maintained for each wireless user supported in the fidelity database shown in FIG. 1.

DETAILED DESCRIPTION OF ILLUSTRATIVE EMBODIMENTS

The present invention appreciates that evaluation of a mobile subscriber's privacy should not be just a black or white, yes or no answer based on the source requesting the privacy information, as in conventional systems. Rather, the present invention provides mobile subscribers with the opportunity to mediate the release of all or part of their privacy information (e.g., the accuracy of their location) based, e.g., on the time when the request for their privacy information (e.g., location) is received. In addition, this feature may be augmented with the ability of the subscriber to adjust the amount or accuracy of their privacy information provided, based on the time when the request for their privacy information is received.

In accordance with the principles of the present invention, location based wireless services in a service provider's network are commissioned and intertwined with a privacy center to automatically provide a range of location information depending upon the subscriber's particular criteria (e.g., time of day or day of week).

The present invention utilizes location based wireless technology in a wireless network to dynamically automate the accuracy of location information provided to requesting parties based on external criteria, e.g., the time of day or the day of week.

Figure 1:
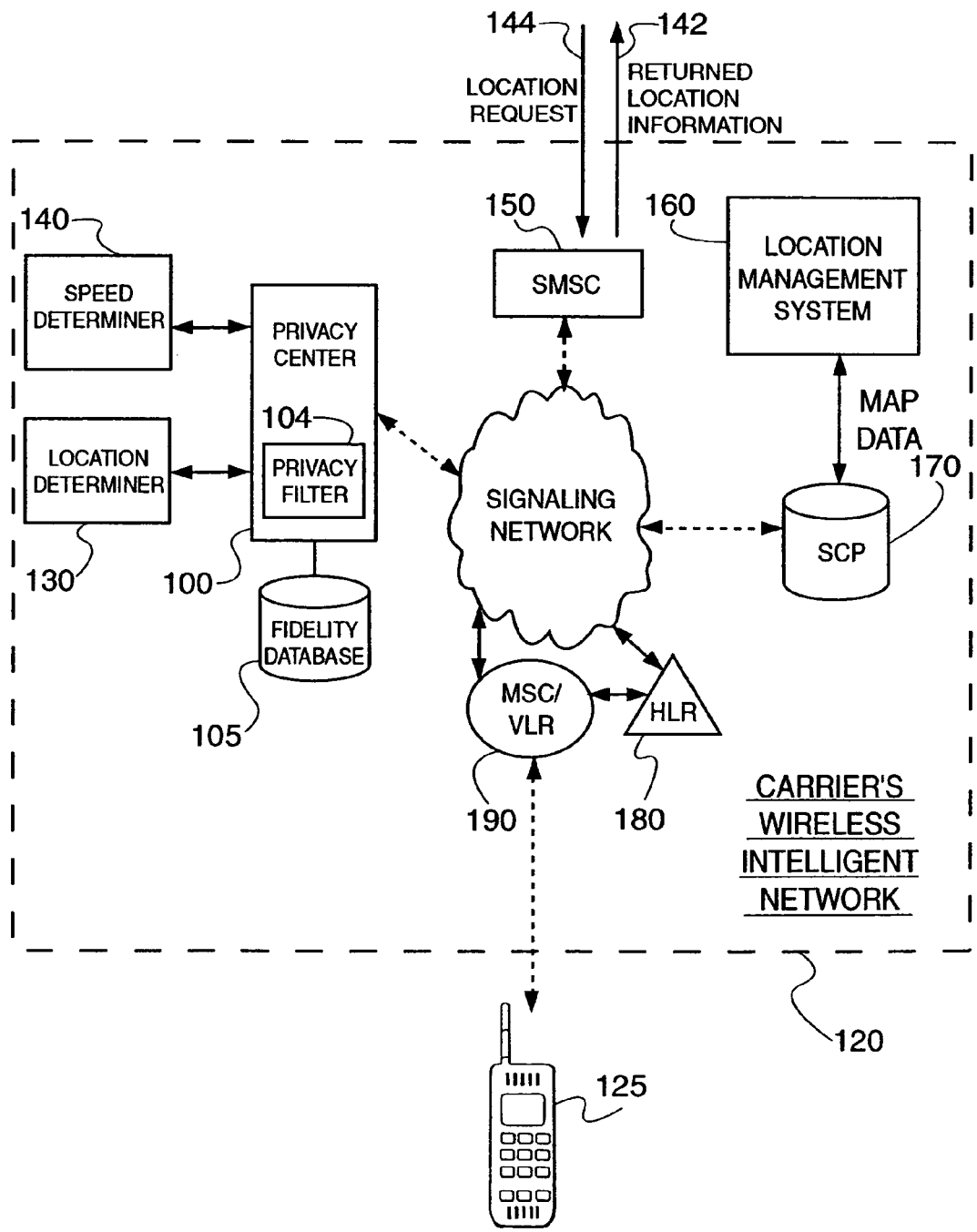
FIG. 1 shows an exemplary location fidelity adjustment system installed in a wireless carrier's network, in accordance with the principles of the present invention.

FIG. 1 shows a privacy center application 100 resident in a carrier's wireless intelligent network, in accordance with the principles of the present invention. The privacy center application 100 may be resident in any of many possible elements in the wireless intelligent network, e.g., in the SCP 170, in accordance with the principles of the present invention.

Upon receipt of a location request 144 by a third party, the wireless network 120 communicates with a location management system 160 and a location determiner 130. A speed determiner 140 may optionally be included to provide rate of movement information regarding the subscriber 125.

Figure 2:
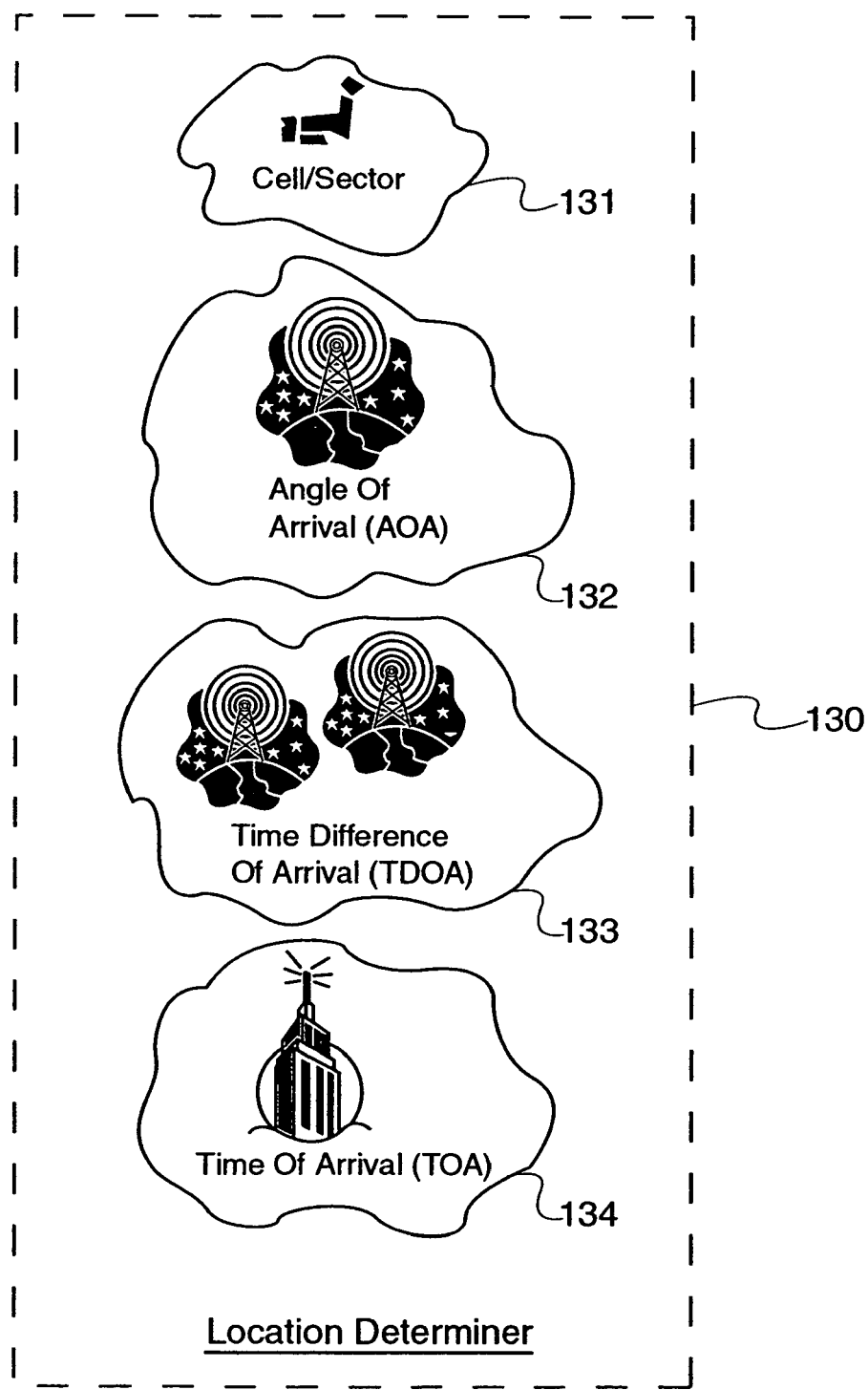
FIG. 2 depicts various embodiments of a location determiner shown in FIG. 1.

FIG. 2 depicts various embodiments of a location determiner 130 shown in FIG. 1.

In particular, as shown in FIG. 2, the location determiner 130 and location management system 160 perform the location management functions of determining subscriber location. Exemplary techniques implemented in the location determiner 130 may be, e.g., cell/sector ID 131, angle of arrival (AOA) 132, time difference of arrival (TDOA) 133, time of arrival (TOA) 134, all of which are otherwise known in the art. The location determiner 130 may include any one or more of the exemplary location modules 131-134 shown in FIG. 2; it need not include all the modules 131-134 shown in FIG. 2. Moreover, these exemplary techniques are exemplary current methods of location determination. The present invention is separate from the particular mechanism used to determine location. Thus, any appropriate location determination mechanism may be used in accordance with the principles of the present invention.

Location information may be determined by a centrally located location determiner 130 (or by an individual wireless user 125 e.g., using a GPS device) and provided to the privacy center 100. Additionally, speed information may optionally be determined by the location management system of the wireless network 120, to augment the location information. For instance, the slower the speed of the subscriber, fewer location updates may be required, lessening the burden on the wireless intelligent network 120.

Returning back to FIG. 1, the wireless network 120 of the disclosed embodiment further includes a Short Message Service Center (SMSC) 150, Message Servicing Center (MSC) with Visitors Location Register (VLR) 190 and Home Location Register (HLR) 180.

The privacy center 100 in accordance with the principles of the present invention utilizes location information determined by a location determiner 130 to provide a proximate location of a wireless user 125, and then importantly adjusts that information based on customized criteria resident in a fidelity database 105 with respect to that particular wireless user 125.

The privacy center 100 may be installed on a dedicated computer system, or may be an application loaded on a computer having other responsibilities and tasks within the wireless network.

The fidelity database 105 contains a plurality of entries, each relating to a particular wireless user 125. For each wireless user, the fidelity of privacy information in general, and location information in particular, may be made less accurate during certain designated times of the day.

In accordance with the principles of the present invention, time and/or location sensitive "fidelity" adjustments to privacy information may be established by the subscriber, on a subscriber-by-subscriber basis. Moreover, the fidelity adjustments may be dynamically changed by the subscriber as their needs change.

"Fidelity" adjustment refers to the ability to filter the amount of private information that is provided to third party requesters, e.g., in a wireless network. In accordance with the principles of the present invention, upon receipt of a request for the location of a particular subscriber, the authorized level of disclosure of privacy information (e.g., location) for that particular wireless user 125 in a fidelity database is checked, and adjusted as necessary, before providing a response to the location request. In response, the location request preferably includes only the authorized portion of the privacy (e.g., location) information (e.g., only a state or a city).

For instance, in the given example of a third party request for the exact location of a particular subscriber, the privacy center 100 receives the request, filters out certain privacy information based on the settings previously established by the subscriber using an appropriate privacy filter 104, and returns the requested location information 142 based on the limitations previously established by the wireless user 125.

For instance, the particular time of receipt of the request for location and/or location of the wireless user 125 may be parameters which alter the amount of private information (e.g., location) that is to be provided to the requesting third party.

The present invention is applicable in conjunction with other methods of providing privacy to wireless users. For instance, opt-out or opt-in systems may be in place to exclude (or include) certain third party requesters from receiving any privacy information from a particular wireless user 125.

After determining that a requestor is allowed to get any level of privacy information regarding a particular wireless user 125, the privacy center 100 checks the privacy preferences previously established by the particular wireless user 125 to determine to what degree of accuracy to report the wireless user's location.

For additional information regarding privacy permission techniques and apparatus, please refer to U.S. Appl. No. 60/367,711, filed Mar. 28, 2002, entitled "Mobile Subscriber Privacy Evaluation Using Solicited vs. Unsolicited Differentiation", the entirety of which is expressly incorporated herein by reference.

If a preference is applicable, then the privacy center 100 retrieves the required privacy information modifier and passes the same to the application from which the location information will be disseminated (e.g., to the location management system 160). If the wireless user's "found" location is more accurate than allowed by the privacy evaluation determined by the privacy center 100 utilizing the wireless user's criteria stored in the fidelity database 105, then the accuracy of the location information must be reduced to the level previously specified by the wireless user 125. The change in the accuracy of the location information may be performed in the privacy center itself, or within the location management system 160 as instructed by the privacy center 100. Accuracy may be reduced using any otherwise conventional suitable technique, e.g., as is performed by the Global Positioning Satellite (GPS) system in times of war. For instance, instead of providing location information to within a 10 foot accuracy, location information may be provided to within a much larger accuracy, e.g., to within 300 feet by randomly moving the location within the desired window of accuracy.

If, on the other hand, the wireless user's "found" location provided by the location determiner 130 is already less accurate than that allowed by the privacy evaluation of the wireless user's privacy criteria as retrieved from the fidelity database 105, then the relevant application (e.g., the location management system 160 or the privacy center 100 itself) may simply disseminate the "found" location to the requesting party.

In the disclosed embodiment, if no preference is selected by the wireless user 125, then the accuracy of the disclosed privacy information preferably defaults to the most accurate setting (e.g., to the street).

Note that although in the present embodiment location is determined by a centrally located location determiner 130, the principles of the invention relate equally to a GPS or similar device in some or all mobile devices 125.

Voice recognition may be implemented in the carrier's wireless network 120 (e.g., accessible to the SCP 170) to simplify a user's input of relevant information, e.g., in setting privacy criteria in their relevant entry in the fidelity database 105.

The privacy center 100 maintains a list that is checked for the mobile subscriber's information every time information is to be disseminated. While in general the list is checked each time a location request is received, this need not correspond one to one with specific location requests. For instance, one form of location request is a "Periodic Location Request". This type of request is established once, and then periodically attempts to report a subscriber's location. Thus, the list is checked every time information is to be disseminated.

The privacy center 100 also provides database tables with which customer carriers can initialize some aspects of a new subscriber's privacy profile. This capability is provided to allow customer carriers to configure the system to closely meet the needs of their customer base.

In both cases all the privacy database tables may initially be empty. This allows new wireless users to utilize location enabled services by calling the service (i.e. soliciting the service) without first having to log in to a web site and add the service provider to an "enable" list. This initial state also prevents the wireless user's information from being passed to anyone without their interaction beforehand.

FIG. 3 shows an exemplary subscriber fidelity setting table 200 maintained for each wireless user 125 supported in the fidelity database 105 shown in FIG. 1.

In particular, as shown in FIG. 3, in one disclosed embodiment, a privacy solution in accordance with the principles of the present invention maintains an ordered list of "preferences" for each wireless user (e.g., mobile subscriber) based on given external criteria. For instance, the accuracy of provided location information may be altered based on the particular time-of-day and/or day-of-week that the location request is received.

In accordance with the principles of the present invention, wireless users may define any of many privacy preferences, e.g., similar in nature to conventional email filters.

Importance may be placed on the ordering of preferences listed for any particular wireless user 125. For instance, the individual entries 202-208 for a particular wireless user 125 may be specifically ordered by the wireless user such that the preferences may be analyzed by the privacy center 100 in the same order. In the given embodiment, preference analysis stops once the first applicable preference is found, making the ordering of individual entries or preferences 202-208 important in such an embodiment.

In the given embodiment, every preference 202-208 in the fidelity settings table 200 can be made up of zero (0) to many constraints and one and only one modifier. Time-of-day and day-of-week are examples of preference constraints. Allowed Accuracy (i.e. street, city, zip code, state, country, or NONE) is an example of a preference modifier.

Any preference with no constraints may be considered "unconstrained" and thus will always be applicable.

Time-of-day and day-of-week constraints are preferably each entered as pairs of values with which ranges may be defined. Preferences with only time-of-day constraints will be applicable in that range of hours every day. Preferences with only day-of-week constraints will be applicable in that range of days every week. Preferences with both time-of-day and day-of-week constraints will be applicable in that range of hours during that range of days every week.

Figure 4:
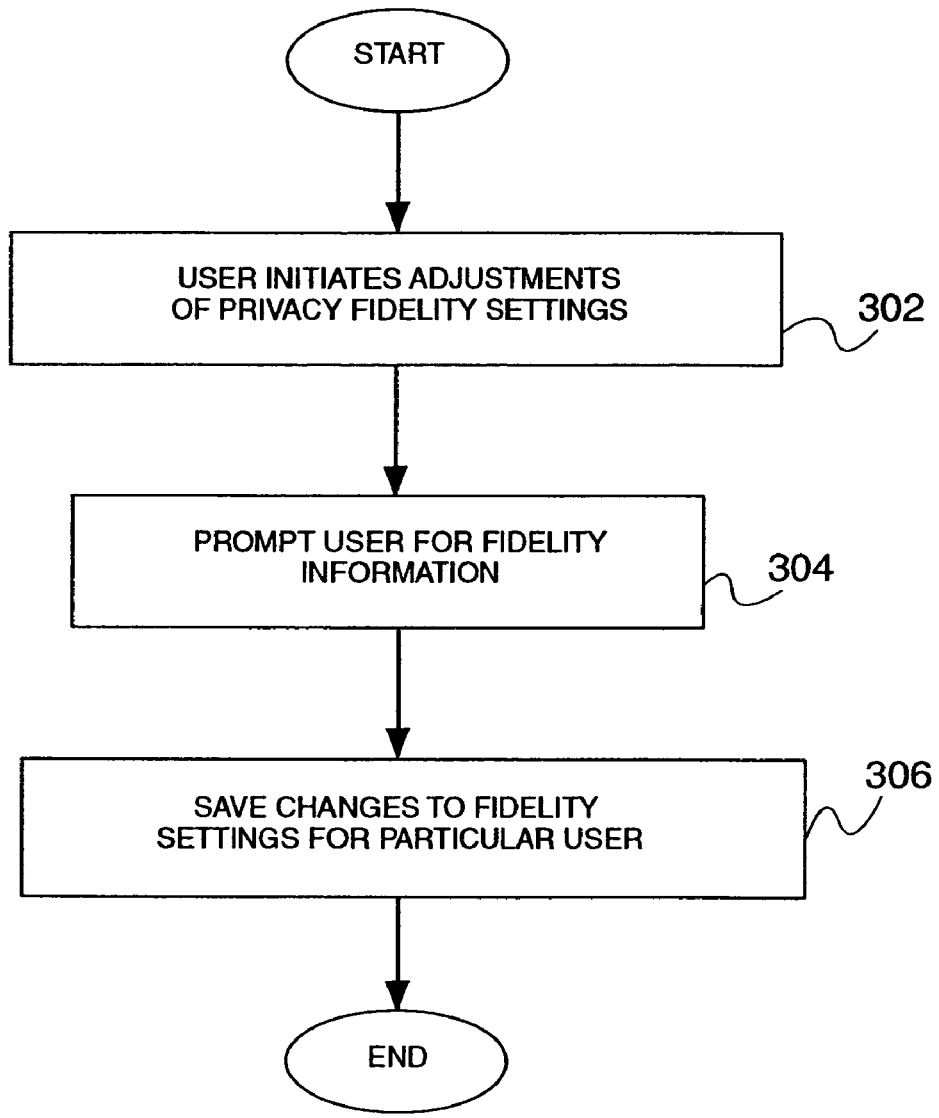
FIG. 4 shows an exemplary process of allowing a subscriber to dynamically adjust their personal location information fidelity, in accordance with the principles of the present invention.

FIG. 4 shows an exemplary process of allowing a subscriber to dynamically adjust their personal location information fidelity, in accordance with the principles of the present invention.

In particular, as shown in step 302 of FIG. 4, a wireless user 125 initiates adjustment of their customizable privacy fidelity preferences 202-208 in the fidelity table 200 stored in the fidelity database 105 relating to them.

In step 304, the wireless user 125 may be prompted (e.g., audibly) for parameters and modifiers from a given menu of options.

In step 306, the selected parameters and modifiers are saved to the fidelity database 105 for use by the privacy center 100.

Figure 5:
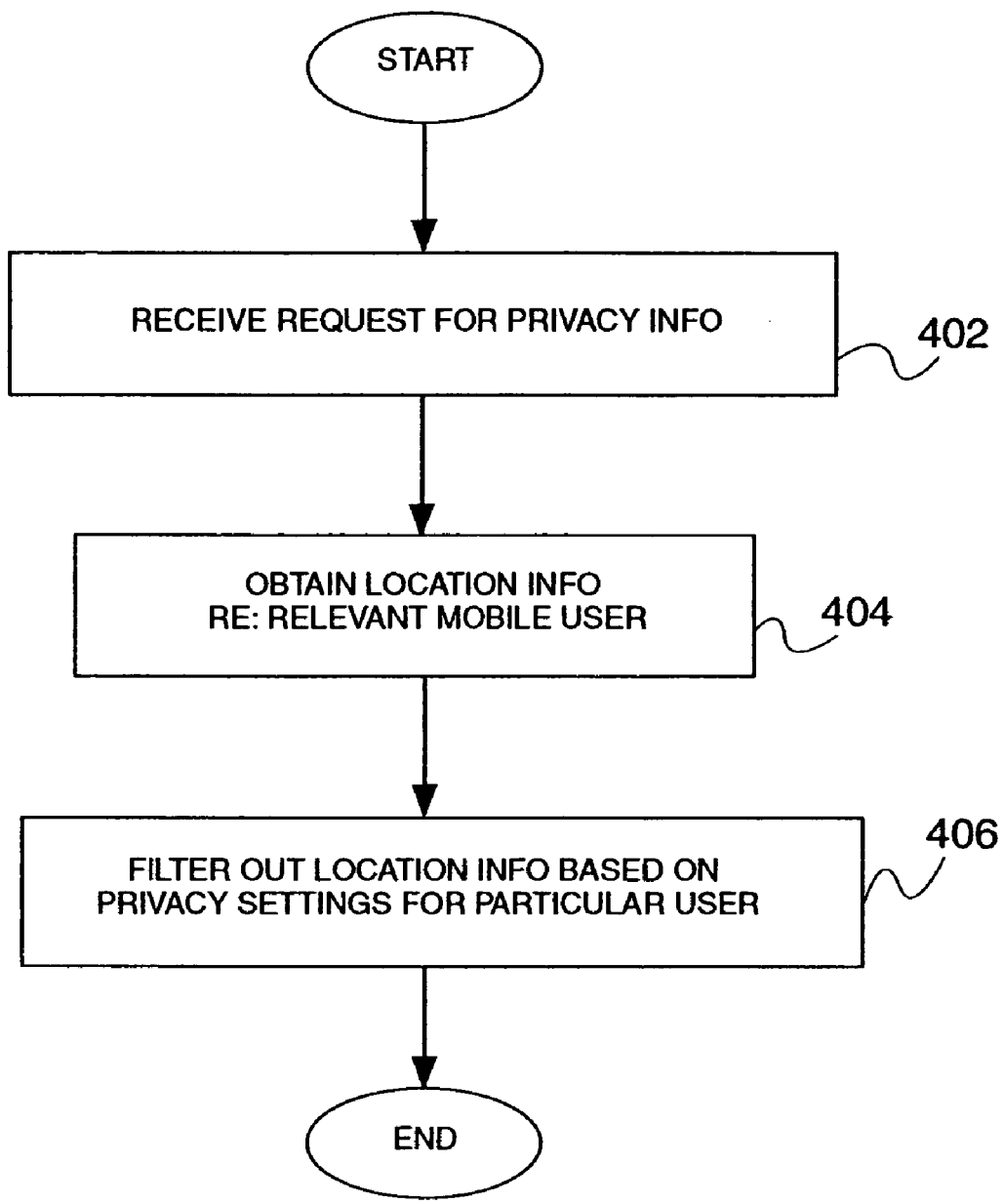
FIG. 5 shows an exemplary process of filtering requested location information in accordance with fidelity settings established for a particular subscriber, in accordance with the principles of the present invention.

FIG. 5 shows an exemplary process of filtering requested location information in accordance with fidelity settings established for a particular subscriber, in accordance with the principles of the present invention.

In particular, as shown in step 402 of FIG. 5, the privacy center 100 receives word of a request for privacy information (e.g., location) of a wireless subscriber 125 within the wireless intelligent network 120.

In step 404, location information is obtained regarding a relevant wireless user 125 from the location determiner 130.

In step 406, a privacy filter function 104 in the privacy center 100 (or other system such as the location management system 160) filters out unauthorized location information based on privacy settings for the requested wireless user 125.

In the disclosed embodiments, location information is made less accurate by removing particular information such as the state, the city, the street, etc. at which the wireless user 125 currently exists. However, the present invention relates equally to a mathematical alteration of the accuracy of location information. For instance, if location information is available to within 10 meters, but less accurate location information is to be provided to a particular requester, the location information may be randomly altered by a given amount (e.g., adding 100 to 1000 meters to the determined location), or may be provided only to within a given region.

While the invention has been described with reference to the exemplary embodiments thereof, those skilled in the art will be able to make various modifications to the described embodiments of the invention without departing from the true spirit and scope of the invention.

What is claimed is:

1. A method of adjusting private information regarding a wireless device, comprising:
    receiving, at a location management system, a first data request for current location information regarding a wireless device from a requesting device;
    transmitting, from said location management system, a second data request for said current location information to a physical location determiner module remote from said location management system, said physical location determiner module obtaining said requested current location information;
    receiving, by said location management system, said current location information from said physical location determiner module;
    adjusting, with said location management system, a degree of accuracy of said current location information corresponding to said wireless device from a more accurate version to a less accurate version based on said current location information of said wireless device, said less accurate version being a reduced degree of accuracy of available location information associated with said wireless device; and
    transmitting said less accurate current location information adjusted via said location management system to said requesting device.

2. The method of adjusting private information regarding a wireless device according to claim 1, wherein:
    said degree of accuracy is further reduced based on a time of day when said first data request is received.

3. The method of adjusting private information regarding a wireless device according to claim 1, wherein:
    said obtained current location is a most accurate current location information of said wireless device.

4. The method of adjusting private information regarding a wireless device according to claim 1, wherein:
    said current location information is obtained from a fidelity database comprising a plurality of device entries, each of said plurality of device entries relating to said particular wireless device.

5. The method of adjusting private information regarding a wireless device according to claim 1, wherein:
    said adjustment of said degree of accuracy of said current location information is performed in conjunction with at least one of an opt-out and opt-in criteria for a wireless device.

6. Apparatus for adjusting private information regarding a wireless device, comprising:

means for receiving, at a location management system, a first data request for current location information regarding a wireless device from a requesting device;

means for transmitting, from said location management system, a second data request for said current location information to a physical location determiner module remote from said location management system, said physical location determiner module obtaining said requested current location information;

means for receiving, by said location management system, said current location information from said physical location determiner module;

means for adjusting, with said location management system, a degree of accuracy of said current location information corresponding to said wireless device from a more accurate version to a less accurate version based on said current location information of said wireless device, said less accurate version being a reduced degree of accuracy of available location information associated with said wireless device; and means for transmitting said less accurate current location information adjusted via said location management system to said requesting device.

7. The apparatus for adjusting private information regarding a wireless device according to claim 6, wherein:

said degree of accuracy is further reduced based on a time of day when said first data request is received.

8. The apparatus for adjusting private information regarding a wireless device according to claim 6, wherein:

said obtained current location information is a most accurate current location information of said wireless device.

9. The apparatus for adjusting private information regarding a wireless device according to claim 6, wherein:

said current location information is obtained from a fidelity database comprising a plurality of device entries, each of said plurality of device entries relating to said particular wireless device.

10. The apparatus for adjusting private information regarding a wireless device according to claim 6, wherein:

said adjustment of said degree of accuracy of said current location information is performed in conjunction with at least one of an opt-out and opt-in criteria for a wireless device.

* * * * *